(12) United States Patent
Kakeshita et al.

(10) Patent No.: US 12,097,846 B2
(45) Date of Patent: Sep. 24, 2024

(54) VEHICLE COLLISION AVOIDANCE ASSIST APPARATUS

(71) Applicant: TOYOTA JIDOSHA KABUSHIKI KAISHA, Toyota (JP)

(72) Inventors: Mafune Kakeshita, Toyota (JP); Yumi Shimanaka, Kasugai (JP); Sho Hashimoto, Shizuoka-ken (JP); Kenta Miyahara, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 17/692,511

(22) Filed: Mar. 11, 2022

(65) Prior Publication Data

US 2022/0314974 A1 Oct. 6, 2022

(30) Foreign Application Priority Data

Mar. 31, 2021 (JP) ................. 2021-060057

(51) Int. Cl.
*B60W 30/09* (2012.01)
*B60W 30/095* (2012.01)
*B60W 40/08* (2012.01)

(52) U.S. Cl.
CPC ........ *B60W 30/09* (2013.01); *B60W 30/0956* (2013.01); *B60W 40/08* (2013.01); *B60W 2540/18* (2013.01); *B60W 2540/223* (2020.02); *B60W 2540/229* (2020.02)

(58) Field of Classification Search
None
See application file for complete search history.

(56) References Cited

U.S. PATENT DOCUMENTS

| 9,472,102 B2* | 10/2016 | McClain ............... B60W 30/09 |
| 10,640,122 B2* | 5/2020 | Kishi .................. G06V 20/597 |
| 2013/0166150 A1 | 6/2013 | Han et al. |
| 2017/0057498 A1 | 3/2017 | Katoh |
| 2020/0122734 A1 | 4/2020 | Sim |

FOREIGN PATENT DOCUMENTS

| JP | 2007-72570 A | 3/2007 |
| JP | 2009-208559 A | 9/2009 |
| JP | 2017-043262 A | 3/2017 |

* cited by examiner

*Primary Examiner* — Todd Melton
(74) *Attorney, Agent, or Firm* — Sughrue Mion, PLLC

(57) ABSTRACT

A vehicle collision avoidance assist apparatus executes a collision avoidance control for avoiding a collision of an own vehicle with an object ahead of the own vehicle. The apparatus determines whether a driver of the own vehicle has a collision self-avoidance probability that the driver can avoid the collision of the own vehicle with the object ahead of the own vehicle by carrying out a driving operation to the own vehicle. When the apparatus determines that the driver does not have the collision self-avoidance probability, the apparatus sets a start timing of starting executing the collision avoidance control to a timing earlier than the start timing set when the apparatus determines that the driver has the collision self-avoidance probability.

7 Claims, 13 Drawing Sheets

VEHICLE COLLISION AVOIDANCE ASSIST APPARATUS

CROSS-REFERENCE TO RELATED APPLICATIONS

This application claims priority to Japanese patent application No. JP 2021-060057 filed on Mar. 31, 2021, the content of which is hereby incorporated by reference in its entirety.

BACKGROUND

Field

The invention relates to a vehicle collision avoidance assist apparatus.

Description of the Related Art

There is known a vehicle collision avoidance assist apparatus which is configured to execute a collision avoidance control including (i) a forcibly steering control and (ii) a forcibly braking control for avoiding a collision of an own vehicle with an object ahead of the own vehicle (for example, see JP 2017-43262 A). The forcibly steering control is a control of forcibly steering the own vehicle to avoid the collision of the own vehicle with the object even when a driver of the own vehicle does not operate a steering wheel of the own vehicle. The forcibly braking control is a control of forcibly applying a braking force to the own vehicle to avoid the collision of the own vehicle with the object even when the driver of the own vehicle does not operate a brake pedal of the own vehicle.

The vehicle collision avoidance assist apparatus starts executing the collision avoidance control when the own vehicle approaches the object ahead of the own vehicle or a forward object, and a predetermined timing has come. In order to surely avoid the collision of the own vehicle with the forward object by the collision avoidance control, it is preferred to start executing the collision avoidance control at an early timing. However, if the start timing of starting executing the collision avoidance control is too early, an execution of the collision avoidance control may be started when the driver of the own vehicle think that the own vehicle is not so close to the forward vehicle to an extent that the driver needs to start driving operations such as operations of pressing the brake pedal and rotating the steering wheel for avoiding the collision of the own vehicle with the forward object. In this case, the driver may feel a discomfort. However, if the start timing of starting executing the collision avoidance control is too late, the collision of the own vehicle with the forward object may not be avoided even when the collision avoidance control is executed.

SUMMARY

An object of the invention is to provide a vehicle collision avoidance assist apparatus which can start executing the collision avoidance control at a timing capable of surely avoiding the collision of the own vehicle with the forward vehicle without providing the driver of the own vehicle with a discomfort.

According to the invention, a vehicle collision avoidance assist apparatus comprises an electronic control unit configured to execute a collision avoidance control for avoiding a collision of an own vehicle with an object ahead of the own vehicle. The electronic control unit is configured to determine whether a driver of the own vehicle has a collision self-avoidance probability that the driver of the own vehicle can avoid the collision of the own vehicle with the object ahead of the own vehicle by carrying out a driving operation to the own vehicle. When the electronic control unit determines that the driver of the own vehicle does not have the collision self-avoidance probability, the electronic control unit is configured to set a start timing of starting executing the collision avoidance control to a timing earlier than the start timing set when the electronic control unit determines that the driver of the own vehicle has the collision self-avoidance probability.

With the invention, when the driver does not have a probability that the driver can carry out a driving operation for avoiding the collision of the own vehicle with the object, an execution of the collision avoidance control is started at a relatively early timing. On the other hand, when the driver has the probability that the driver can carry out the driving operation for avoiding the collision of the own vehicle with the object, the execution of the collision avoidance control is started at a relatively late timing. Thus, the execution of the collision avoidance control can be started at a timing capable of surely avoiding the collision of the own vehicle with the object without providing the driver with a discomfort.

According to an aspect of the invention, the electronic control unit may be configured to execute a forcibly steering control of forcibly steering the own vehicle as the collision avoidance control to avoid the collision of the own vehicle with the object ahead of the own vehicle.

With this aspect of the invention, the execution of the forcibly steering control can be started at a timing capable of surely avoiding the collision of the own vehicle with the object without providing the driver with a discomfort.

According to another aspect of the invention, the electronic control unit may be configured to detect a grasping state of the driver of the own vehicle grasping a steering wheel of the own vehicle. In this aspect, the electronic control unit may be configured to determine whether the driver of the own vehicle has the collision self-avoidance capability, based on the grasping state.

The grasping state of the driver grasping the steering wheel effectively represents the collision self-avoidance probability. With this aspect of the invention, whether the driver has the collision self-avoidance probability is determined, based on the grasping state of the driver grasping the steering wheel. Thus, whether the driver has the collision self-avoidance probability can be appropriately determined.

According to further another aspect of the invention, the electronic control unit may be configured to detect a grasping action of grasping the steering wheel carried out by the driver of the own vehicle as the grasping state.

The grasping action of grasping the steering wheel by the driver effectively represents the collision self-avoidance probability. With this aspect of the invention, whether the driver has the collision self-avoidance probability is determined, based on the grasping action of grasping the steering wheel by the driver. Thus, whether the driver has the collision self-avoidance probability can be appropriately determined.

According to further another aspect of the invention, the electronic control unit may be configured to detect portions of the steering wheel which the driver of the own vehicle grasps as the grasping state.

The portions of the steering wheel which the driver grasps effectively represent the collision self-avoidance probability.

With this aspect of the invention, whether the driver has the collision self-avoidance probability is determined, based on the portions of the steering wheel which the driver grasps. Thus, whether the driver has the collision self-avoidance probability can be appropriately determined.

According to further another aspect of the invention, the electronic control unit may be configured to detect a consciousness state of the driver of the own vehicle and determine the collision self-avoidance probability, based on the consciousness state.

The driver's consciousness state effectively represents the collision self-avoidance probability. With this aspect of the invention, whether the driver has the collision self-avoidance probability is determined, based on the driver's consciousness state. Thus, whether the driver has the collision self-avoidance probability can be appropriately determined.

According to further another aspect of the invention, the electronic control unit may be configured to detect a grasping state of the driver of the own vehicle grasping a steering wheel of the own vehicle and a consciousness state of the driver of the own vehicle. In this aspect, the electronic control unit may be configured to determine whether the driver of the own vehicle has the collision self-avoidance probability, based on the grasping state and the consciousness state. Further, in this case, when the electronic control unit determines that the driver of the own vehicle does not have the collision self-avoidance probability, based on the consciousness state, the electronic control unit may be configured to set the start timing of starting executing the collision avoidance control to a timing earlier than the start timing set when the electronic control unit determines that the driver of the own vehicle does not have the collision self-avoidance probability, based on the grasping state.

When the driver's consciousness state shows that the driver does not have the collision self-avoidance probability, the collision self-avoidance probability is low, compared with when the driver's steering wheel grasping state shows that the driver does not have the collision self-avoidance probability. With this aspect of the invention, when the electronic control unit determines that the driver does not have the collision self-avoidance probability, based on the driver's consciousness state, the execution of the collision avoidance control is started at a time earlier than when the electronic control unit determines that the driver does not have the collision self-avoidance probability, based on the driver's steering wheel grasping state. Thus, the execution of the collision avoidance control can be started at an appropriate timing.

According to further another aspect of the invention, the electronic control unit may be configured to detect a grasping state of the driver of the own vehicle grasping a steering wheel of the own vehicle and a consciousness state of the driver of the own vehicle. In this aspect, the electronic control unit may be configured to determine whether the driver of the own vehicle has the collision self-avoidance probability, based on the grasping state and the consciousness state. Further in this aspect, when the electronic control unit determines that the driver of the own vehicle does not have the collision self-avoidance probability, based on the consciousness state, and the driver of the own vehicle has the collision self-avoidance probability, based on the grasping state, the electronic control unit may be configured to determine that the driver of the own vehicle does not have the collision self-avoidance probability.

When the driver's steering wheel grasping state shows that the driver has the collision self-avoidance probability, but the driver's consciousness state shows that the driver does not have the collision self-avoidance probability, the collision self-avoidance probability is probably low. With this aspect of the invention, when even if the electronic control unit determines that the driver has the collision self-avoidance probability, based on the driver's steering wheel grasping state, but the electronic control unit determines that the driver does not have the collision self-avoidance probability, based on the driver's consciousness state, the electronic control unit conclusively determines that the driver does not have the collision self-avoidance probability. Thus, the execution of the collision avoidance control can be started at an appropriate timing.

According to further another aspect of the invention, the electronic control unit may be configured to determine that the driver of the own vehicle does not have the collision self-avoidance probability when the electronic control unit determines that the driver of the own vehicle has the collision self-avoidance probability, based on the consciousness state, and the driver of the own vehicle does not have the collision self-avoidance probability, based on the grasping state.

When the driver's consciousness state shows that the driver has the collision self-avoidance probability, but the driver's steering wheel grasping state shows that the driver does not have the collision self-avoidance probability, the collision self-avoidance probability is probably relatively low. With this aspect of the invention, when the electronic control unit determines that the driver has the collision self-avoidance probability, based on the driver's consciousness state, but the electronic control unit determines that the driver does not have the collision self-avoidance probability, based on the driver's steering wheel grasping state, the electronic control unit conclusively determines that the driver does not have the collision self-avoidance probability. Thus, the execution of the collision avoidance control can be started at an appropriate timing.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
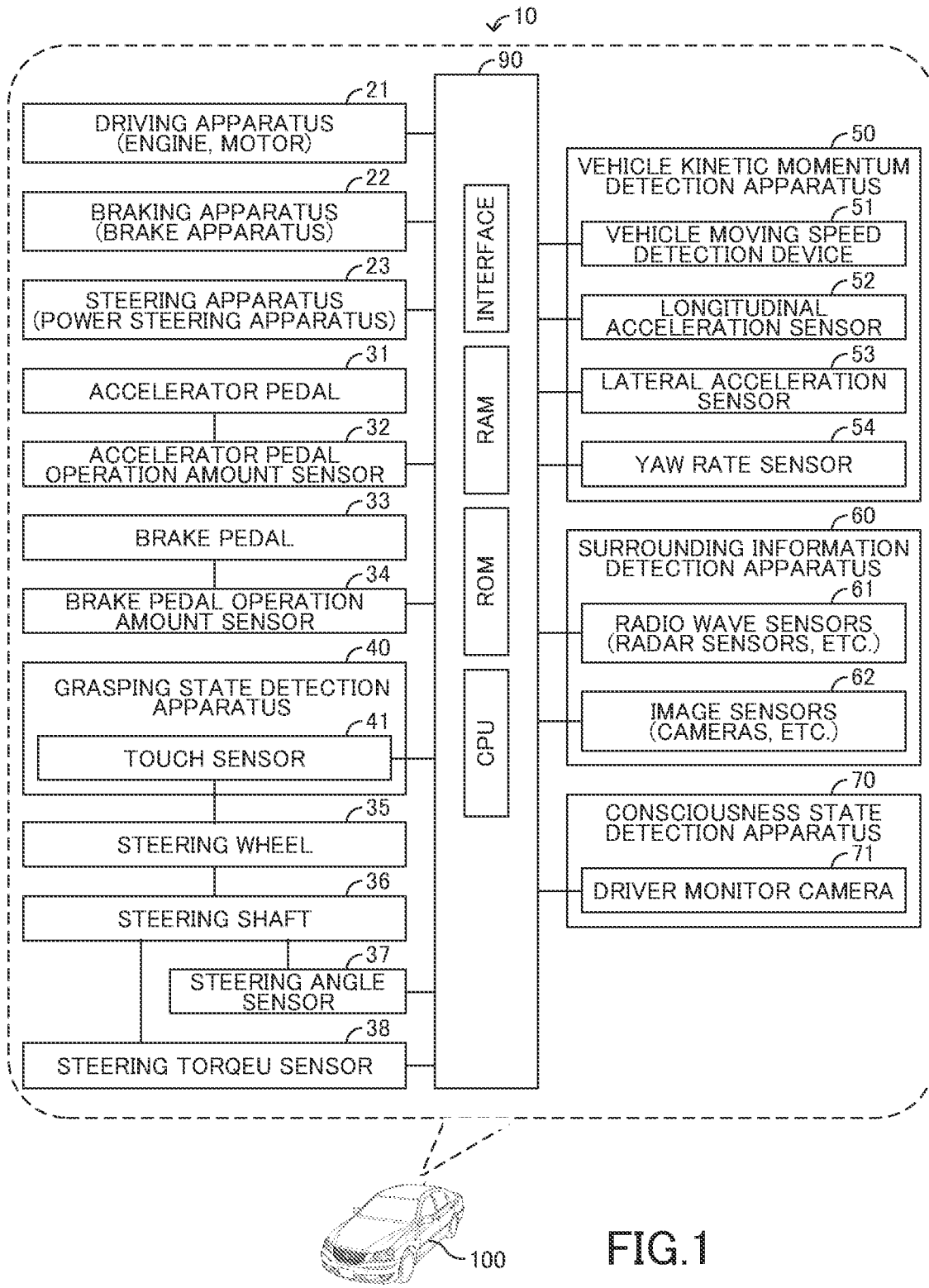
FIG. 1 is a view which shows a vehicle collision avoidance assist apparatus according to an embodiment of the invention and a vehicle or an own vehicle to which the vehicle collision avoidance assist apparatus is applied.

Below, a vehicle collision avoidance assist apparatus according to an embodiment of the invention will be described with reference to the drawings. As shown in FIG. 1, the vehicle collision avoidance assist apparatus 10 according to the embodiment of the invention is installed on an own vehicle 100.

<ECU>

The vehicle collision avoidance assist apparatus 10 includes an ECU 90. ECU stands for electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines memorized in the ROM.

<Driving Apparatus, Etc.>

Further, a driving apparatus 21, a braking apparatus 22, and a steering apparatus 23 are installed on the own vehicle 100.

<Driving Apparatus>

The driving apparatus 21 is an apparatus which outputs a driving torque TQ_D or a driving force to be applied to the own vehicle 100 to move the own vehicle 100. The driving apparatus 21 includes, for example, an internal combustion engine and at least one electric motor. The driving apparatus 21 is electrically connected to the ECU 90. The ECU 90 can control the driving torque TQ_D output from the driving apparatus 21 by controlling activations of the driving apparatus 21.

<Braking Apparatus>

The braking apparatus 22 is an apparatus which outputs a braking torque TQ_B or a braking force to be applied to the own vehicle 100 to brake the own vehicle 100. The braking apparatus 22 includes, for example, a brake apparatus. The braking apparatus 22 is electrically connected to the ECU 90. The ECU 90 can control the braking torque TQ_B output from the braking apparatus 22 by controlling activations of the braking apparatus 22.

<Steering Apparatus>

The steering apparatus 23 is an apparatus which outputs a steering torque TQs or a steering force to be applied to the own vehicle 100 to steer the own vehicle 100. The steering apparatus 23 includes, for example, a power steering apparatus. The steering apparatus 23 is electrically connected to the ECU 90. The ECU 90 can control the steering torque TQs output from the steering apparatus 23 by controlling activations of the steering apparatus 23.

<Sensors, Etc.>

Further, an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a grasping state detection apparatus 40, a vehicle kinetic momentum detection apparatus 50, a surrounding information detection apparatus 60, and a consciousness state detection apparatus 70 are installed on the own vehicle 100.

<Accelerator Pedal Operation Amount Sensor>

The accelerator pedal operation amount sensor 32 is a sensor which detects an operation amount of the accelerator pedal 31. The accelerator pedal operation amount sensor 32 is electrically connected to the ECU 90. The accelerator pedal operation amount sensor 32 sends information on the detected operation amount of the accelerator pedal 31 to the ECU 90. The ECU 90 acquires the operation amount of the accelerator pedal 31 as an accelerator pedal operation amount AP, based on the information sent from the accelerator pedal operation amount sensor 32.

In addition, the ECU 90 calculates and acquires a requested driving torque TQ_D_req or a requested driving force, based on the accelerator pedal operation amount AP and a vehicle moving speed V100 of the own vehicle 100. The requested driving torque TQ_D_req is a driving torque TQ_D requested to be output from the driving apparatus 21. The ECU 90 controls the activations of the driving apparatus 21 so as to output the driving torque corresponding to the requested driving torque TQ_D_req.

<Brake Pedal Operation Amount Sensor>

The brake pedal operation amount sensor 34 is a sensor which detects an operation amount of the brake pedal 33. The brake pedal operation amount sensor 34 is electrically connected to the ECU 90. The brake pedal operation amount sensor 34 sends information on the detected operation amount of the brake pedal 33 to the ECU 90. The ECU 90 acquires the operation amount of the brake pedal 33 as a brake pedal operation amount BP, based on the information sent from the brake pedal operation amount sensor 34.

In addition, the ECU 90 calculates and acquires a requested braking torque TQ_B_req or a requested braking force, based on the brake pedal operation amount BP. The requested braking torque TQ_B_req is a braking torque TQ_B requested to be output from the braking apparatus 22. The ECU 90 controls the activations of the braking apparatus 22 so as to output the braking torque corresponding to the requested braking torque TQ_B_req.

<Steering Angle Sensor>

The steering angle sensor 37 is a sensor which detects a rotation angle of the steering shaft 36 with respect to a neutral position. The steering angle sensor 37 is electrically connected to the ECU 90. The steering angle sensor 37 sends information on the detected rotation angle of the steering shaft 36 to the ECU 90. The ECU 90 acquires the rotation angle of the steering shaft 36 as a steering angle θsteer, based on the information sent from the steering angle sensor 37.

<Steering Torque Sensor>

The steering torque sensor 38 is a sensor which detects a torque input to the steering shaft 36 via the steering wheel 35 by a driver of the own vehicle 100. The steering torque sensor 38 is electrically connected to the ECU 90. The steering torque sensor 38 sends information on the detected torque to the ECU 90. The ECU 90 acquires the torque input to the steering shaft 36 via the steering wheel 35 by the driver as a driver input toque TQs_driver, based on the information sent from the steering torque sensor 38.

<Grasping State Detection Apparatus>

The grasping state detection apparatus 40 is an apparatus which detects a grasping state of the driver of the own vehicle 100 grasping the steering wheel 35. In this embodiment, the grasping state detection apparatus 40 includes a touch sensor 41 mounted on the steering wheel 35.

<Touch Sensor>

The touch sensor 41 is a sensor which detects a touch interaction to the steering wheel 35 carried out by the driver of the own vehicle 100. The touch sensor 41 is electrically connected to the ECU 90. When the touch sensor 41 detects the touch interaction to the steering wheel 35 carried by the driver of the own vehicle 100, the touch sensor 41 sends information or a signal on a portion of the steering wheel 35 which the driver of the own vehicle 100 touches to the ECU 90. The ECU 90 can recognize the portion of the steering wheel 35 which the driver of the own vehicle 100 touches, based on the information or the signal sent from the touch sensor 41.

<Vehicle Kinetic Momentum Detection Apparatus>

The vehicle kinetic momentum detection apparatus 50 is an apparatus which detects kinetic momenta of the own vehicle 100. In this embodiment, the vehicle kinetic momentum detection apparatus 50 includes a vehicle moving speed detection device 51, a longitudinal acceleration sensor 52, a lateral acceleration sensor 53, and a yaw rate sensor 54.

<Vehicle Moving Speed Detection Device>

The vehicle moving speed detection device 51 is a device which detects a vehicle moving speed of the own vehicle 100. The vehicle moving speed detection device 51 includes, for example, vehicle wheel rotation speed sensors. The vehicle moving speed detection device 51 is electrically connected to the ECU 90. The vehicle moving speed detection device 51 sends information on the detected vehicle moving speed of the own vehicle 100 to the ECU 90. The ECU 90 acquires a vehicle moving speed V100 of the own vehicle 100, based on the information sent from the vehicle moving speed detection device 51.

In addition, the ECU 90 calculates and acquires a requested steering torque TQs_req, based on the acquired steering angle θsteer, the acquired driver input torque TQs_driver, and the acquired vehicle moving speed V100. The requested steering torque TQs_req is a steering torque TQs requested to be output from the steering apparatus 23. The ECU 90 controls the activations of the steering apparatus 23 so as to output the steering torque corresponding to the requested steering torque TQs_req from the steering apparatus 23. It should be noted that when the ECU 90 executes a forcibly steering control described later, the ECU 90 suitably determines the steering torque TQs necessary to move the own vehicle 100 along a target avoidance route Rtgt as the requested steering torque TQs_req and controls the activations of the steering apparatus 23 so as to output the steering torque corresponding to the requested steering torque TQs_req.

<Longitudinal Acceleration Sensor>

The longitudinal acceleration sensor 52 is a sensor which detects a longitudinal acceleration of the own vehicle 100. The longitudinal acceleration sensor 52 is electrically connected to the ECU 90. The longitudinal acceleration sensor 52 sends information on the detected acceleration to the ECU 90. The ECU 90 acquires the longitudinal acceleration of the own vehicle 100 as a longitudinal acceleration value Gx, based on the information sent from the longitudinal acceleration sensor 52.

<Lateral Acceleration Sensor>

The lateral acceleration sensor 53 is a sensor which detects a lateral (width direction) acceleration of the own vehicle 100. The lateral acceleration sensor 53 is electrically connected to the ECU 90. The lateral acceleration sensor 53 sends information on the detected acceleration to the ECU 90. The ECU 90 acquires the lateral acceleration of the own vehicle 100 as a lateral acceleration value Gy, based on the information sent from the lateral acceleration sensor 53.

<Yaw Rate Sensor>

The yaw rate sensor 54 is a sensor which detects a yaw rate YR of the own vehicle 100. The yaw rate sensor 54 is electrically connected to the ECU 90. The yaw rate sensor 54 sends information on the detected yaw rate YR to the ECU 90. The ECU 90 acquires the yaw rate YR of the own vehicle 100, based on the information sent from the yaw rate sensor 54.

<Surrounding Information Detection Apparatus>

The surrounding information detection apparatus 60 is an apparatus which detects information on a surrounding of the own vehicle 100. In this embodiment, the surrounding information detection apparatus 60 includes radio wave sensors 61 and image sensors 62. The radio wave sensor 61 is, for example, a radar sensor or a millimeter wave radar. The image sensor 62 is, for example, a camera. It should be noted that the surrounding information detection apparatus 60 may include sonic sensors such as ultrasonic wave sensors or clearance sonars and/or optical sensors such as laser radars or LiDAR.

<Radio Wave Sensors>

The radio wave sensors 61 are electrically connected to the ECU 90. The radio wave sensor 61 transmits radio waves and receives the radio waves reflected on an object, i.e., reflected waves. The radio wave sensor 61 sends information or detection results on the transmitted radio waves and the received radio waves, i.e., the received reflected waves to the ECU 90. In other words, the radio wave sensor 61 detects an object around the own vehicle 100 and sends the information or the detection result on the detected object to the ECU 90. The ECU 90 can acquire information on the object around the own vehicle 100 as surrounding detection information I_D, based on the information or radio wave information sent from the radio wave sensors 61.

It should be noted that the object is a vehicle, a motor bike, a bicycle, or a person.

<Image Sensors>

The image sensors 62 are also electrically connected to the ECU 90. The image sensor 62 takes images of a view around the own vehicle 100 and sends information on the taken images to the ECU 90. The ECU 90 can acquire information on the surrounding of the own vehicle 100 as the surrounding detection information I_D, based on the information, i.e., image information sent from the image sensors 62.

Figure 2:
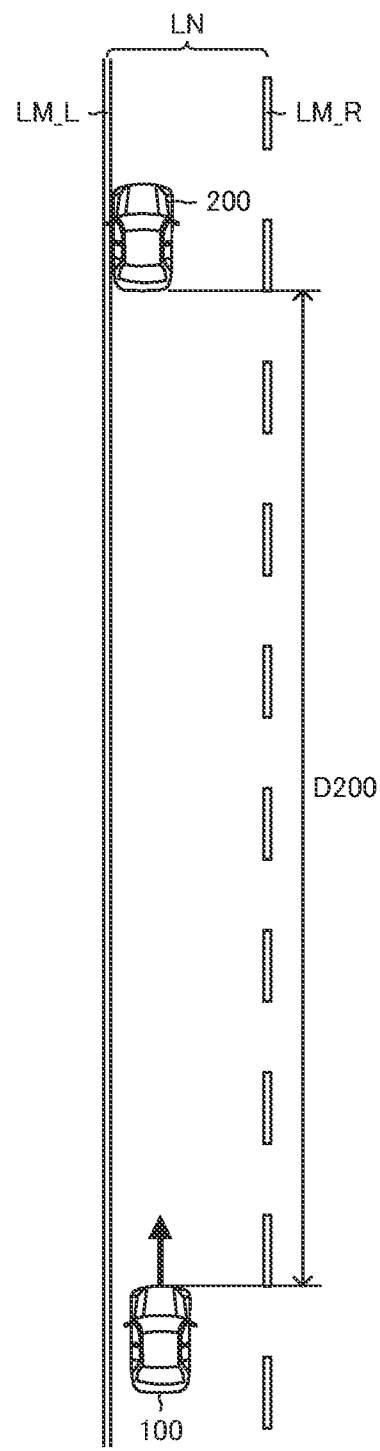
FIG. 2 is a view which shows a distance between the own vehicle and an object or a vehicle ahead of the own vehicle, etc.

As shown in FIG. 2, when there is an object or a forward object 200 ahead of the own vehicle 100, the ECU 90 detects the forward object 200, based on the surrounding detection information I_D. It should be noted that the forward object 200 is, for example, a vehicle, a motor bike, a bicycle, or a person. In an example shown in FIG. 2, the forward object 200 is a vehicle.

When the ECU 90 detects the forward object 200, the ECU 90 acquires an object distance D200 and a relative speed ΔV200, for example, based on the surrounding detection information I_D. The object distance D200 is a distance between the forward object 200 and the own vehicle 100. The relative speed ΔV200 is a speed of the own vehicle 100 with respect to the forward object 200.

In addition, the ECU 90 recognizes a left lane marking LM_L and a right lane marking LM_R, based on the surrounding detection information I_D. The left lane marking LM_L and the right lane marking LM_R define a moving lane of the own vehicle 100 or an own vehicle moving lane LN. The ECU 90 can determine an area of the own vehicle moving lane LN, based on the recognized left and right lane markings LM, i.e., the recognized left lane marking LM_L and the recognized right lane marking LM_R.

<Consciousness State Detection Apparatus>

The consciousness state detection apparatus 70 is an apparatus which detects a consciousness state of the driver of the own vehicle 100. In this embodiment, the consciousness state detection apparatus 70 is a driver monitor camera 71. The driver monitor camera 71 is provided in an interior of the own vehicle 100, facing the driver of the own vehicle 100 so as to take an image of a face of the driver of the own vehicle 100.

<Driver Monitor Camera>

The driver monitor camera 71 is a camera which takes images of a face of the driver of the own vehicle 100. The driver monitor camera 71 is electrically connected to the ECU 90. The driver monitor camera 71 sends information or image data on the taken images of the face of the driver to the ECU 90. The ECU 90 determines whether eyes of the driver of the own vehicle 100 are open, i.e., the driver of the own vehicle 100 is conscious, based on the information sent from the driver monitor camera 71.

It should be noted that the ECU 90 may be configured to acquire vital data such as a temperature, a pulse, and a blood pressure of the driver of the own vehicle 100 and determine whether the driver of the own vehicle 100 is awake, i.e., whether the driver of the own vehicle 100 is conscious, based on the acquired vital data.

<Summary of Operations of Vehicle Collision Avoidance Assist Apparatus>

Next, a summary of operations of the vehicle collision avoidance assist apparatus 10 will be described.

The vehicle collision avoidance assist apparatus 10 executes a process of detecting objects such as vehicles in a moving direction of the own vehicle 100, i.e., ahead of the own vehicle 100, based on the surrounding detection information I_D while the own vehicle 100 moves. The own vehicle 100 executes a normal moving control while the vehicle collision avoidance assist apparatus 10 detects no objects in the moving direction of the own vehicle 100, i.e., ahead of the own vehicle 100.

The normal moving control is a control of (i) controlling the activations of the driving apparatus 21 to output the driving torque corresponding to the requested driving torque TQ_D_req from the driving apparatus 21 when the requested driving torque TQ_D_req or the requested driving force is greater than zero, (ii) controlling the activations of the braking apparatus 22 to output the braking torque corresponding to the requested braking torque TQ_B_req from the braking apparatus 22 when the requested braking torque TQ_B_req or the requested braking force is greater than zero, and (iii) controlling the activations of the steering apparatus 23 to output the steering torque corresponding to the requested steering torque TQs_req from the steering apparatus 23 when the requested steering torque TQs_req or the requested steering force is greater than zero.

When the vehicle collision avoidance assist apparatus 10 detects an object or the forward object 200 ahead of the own vehicle 100 in the moving direction of the own vehicle 100, the vehicle collision avoidance assist apparatus 10 determines whether the object is in a predicted moving area A100, based on the surrounding detection information I_D.

Figure 3A:
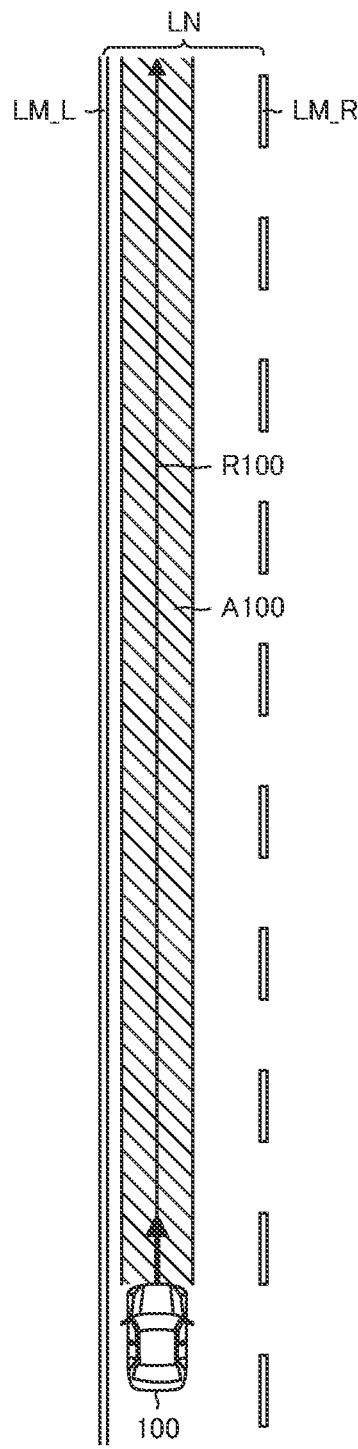
FIG. 3A is a view which shows a predicted moving area of the own vehicle.
Figure 3B:
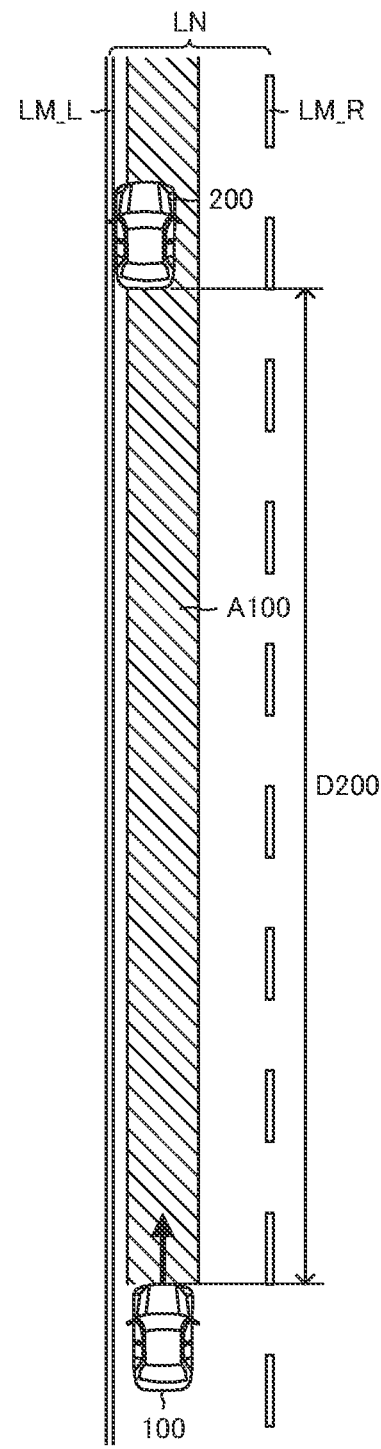
FIG. 3B is a view which shows a scene that the object or the vehicle is in the predicted moving area of the own vehicle.

As shown in FIG. 3A, the predicted moving area A100 is an area which has (i) a center line corresponding to a predicted moving route R100 of the own vehicle 100 and (ii) a width equal to a width of the own vehicle 100. The predicted moving route R100 is a moving route along which the own vehicle 100 predictively moves if the own vehicle 100 moves, maintaining the current steering angle θsteer. The predicted moving route R100 shown in FIG. 3A is a straight line, but may be a curved line.

When the detected forward object 200 is not in the predicted moving area A100, the vehicle collision avoidance assist apparatus 10 continues executing the normal moving control.

On the other hand, when the vehicle collision avoidance assist apparatus 10 determines that the detected forward object 200 is in the predicted moving area A100, the vehicle collision avoidance assist apparatus 10 determines a collision probability. The collision probability is a probability that the own vehicle 100 collides with the forward object 200.

In this embodiment, the vehicle collision avoidance assist apparatus 10 acquires an object distance D200 and determines the collision probability, based on whether the acquired object distance D200 is equal to or shorter than a predetermined distance or a collision probability determination distance Dth. The object distance D200 is a distance between the forward object 200 and the own vehicle 100.

<Acquisition of Avoidance Route>

Figure 4A:
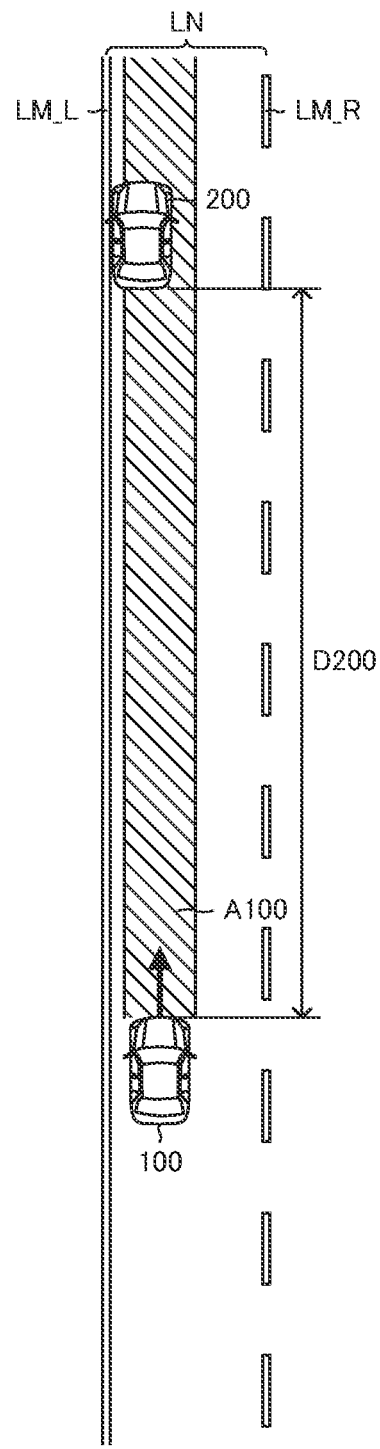
FIG. 4A is a view which shows a scene that the own vehicle approaches the object or the vehicle in the predicted moving area of the own vehicle.

When (i) the own vehicle 100 approaches the forward object 200 as shown in FIG. 4A, (ii) the object distance D200 decreases to the collision probability determination distance Dth, and (iii) the vehicle collision avoidance assist apparatus 10 determines that the object distance D200 is equal to or shorter than the collision probability determination distance Dth, the vehicle collision avoidance assist apparatus 10 determines that an avoidance route acquisition condition Croute becomes satisfied.

When the vehicle collision avoidance assist apparatus 10 determines that the avoidance route acquisition condition Croute becomes satisfied, the vehicle collision avoidance assist apparatus 10 starts a process of acquiring an avoidance route R, based on the surrounding detection information I_D.

The avoidance route R is a route along which the own vehicle 100 is moved for avoiding a collision of the own vehicle 100 with the forward object 200. When the own vehicle 100 is moved along the avoidance route R, the own vehicle 100 moves within the own vehicle moving lane LN and passes by the forward object 200 as shown in FIG. 4B.

Figure 4B:
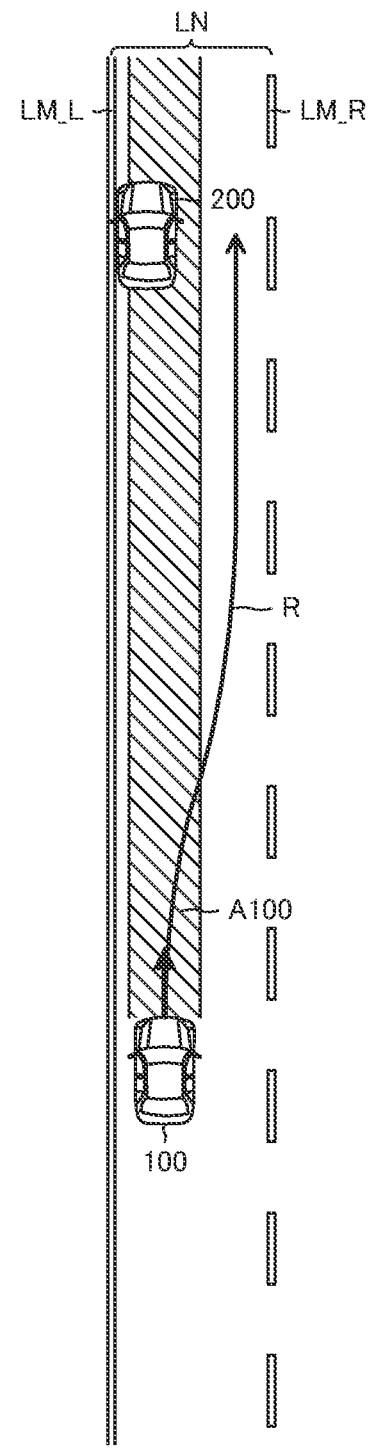
FIG. 4B is a view which shows an avoidance route.

It should be noted that the avoidance route R of an example shown in FIG. 4B passes a right side of the forward object 200, but when there is a space at a left side of the forward object 200 which allows the vehicle collision avoidance assist apparatus 10 to cause the own vehicle 100 to move and pass by the forward object 200 within the own vehicle moving lane LN, a route passing the left side of the forward object 200 may be acquired as the avoidance route R.

<Determination of Start Timing of Forcibly Steering Control>

In addition, when (i) the object distance D200 becomes equal to or shorter than the collision probability determination distance Dth, and (ii) the vehicle collision avoidance assist apparatus 10 determines that the own vehicle 100 has the collision probability, the vehicle collision avoidance assist apparatus 10 determines that a forcibly steering start determination condition Cd_steer becomes satisfied.

When the vehicle collision avoidance assist apparatus 10 determines that the forcibly steering start determination condition Cd_steer becomes satisfied, the vehicle collision avoidance assist apparatus 10 determines a start timing of starting executing a forcibly steering control or a forcibly steering start timing Ts_steer.

In this embodiment, the vehicle collision avoidance assist apparatus 10 determines the forcibly steering start timing Ts_steer, based on a predicted reaching time TTC. The predicted reaching time TTC is a time predictively taken for the own vehicle 100 to reach the forward object 200. The vehicle collision avoidance assist apparatus 10 acquires the predicted reaching time TTC by dividing the object distance D200 by the relative speed ΔV200 (TTC=D200/ΔV200).

As far as the forward object 200 is in the predicted moving area A100, the vehicle collision avoidance assist apparatus 10 executes processes of acquiring the object distance D200, the relative speed ΔV200, and the predicted reaching time TTC with a predetermined calculation cycle.

The vehicle collision avoidance assist apparatus 10 determines whether the predicted reaching time TTC decreases to a predetermined time or a collision determination time TTCth. It should be noted that the predicted reaching time TTC decreases as the own vehicle 100 approaches the forward object 200 assuming that the relative speed ΔV200 is constant.

As far as the predicted reaching time TTC is longer than the collision determination time TTCth, the vehicle collision avoidance assist apparatus 10 continues executing the normal moving control.

Figure 5A:
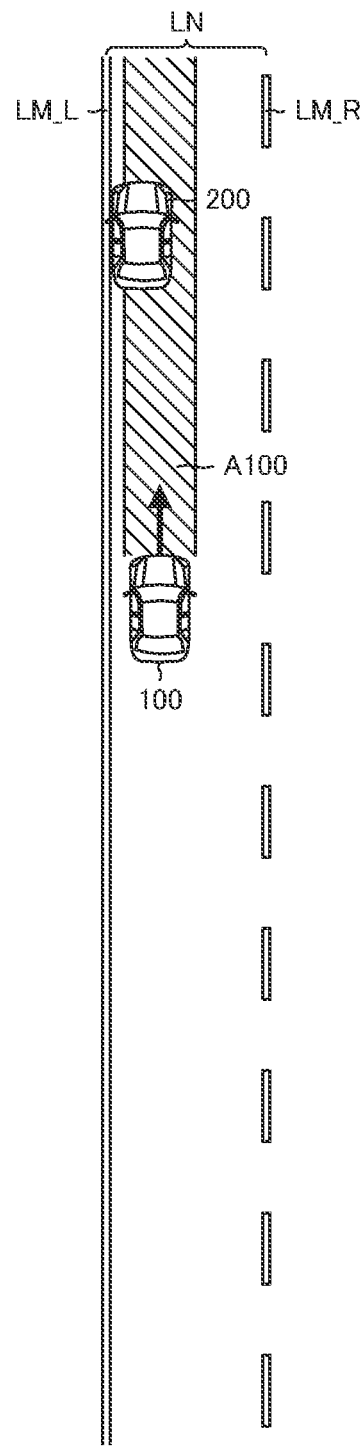
FIG. 5A is a view which shows a scene that a start timing of starting executing a forcibly steering control has come.
Figure 5B:
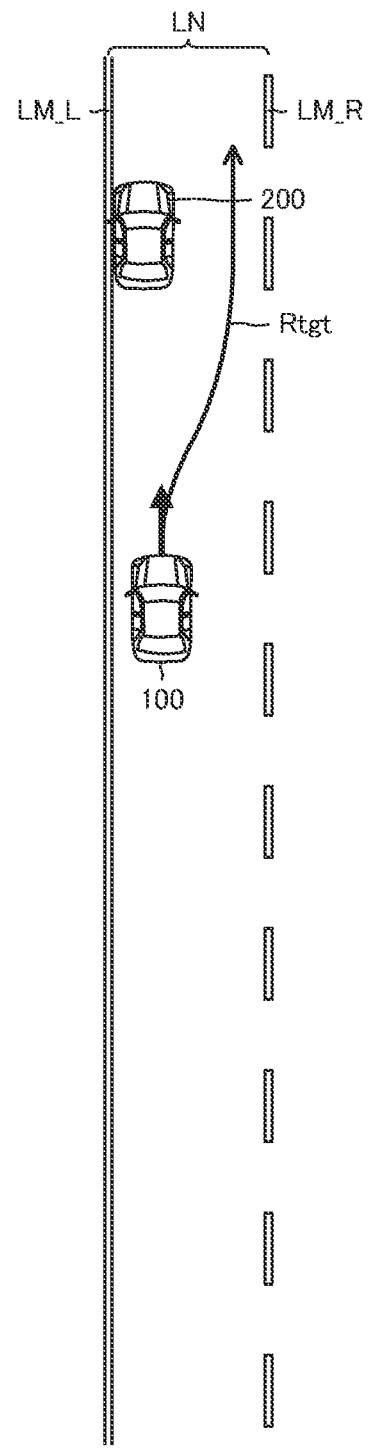
FIG. 5B is a view which shows a target avoidance route set for the forcibly steering control.

On the other hand, when (i) the own vehicle 100 approaches the forward object 200, and (ii) the predicted reaching time TTC decreases to the collision determination time TTCth as show in FIG. 5 without a collision avoidance steering wheel operation carried out by the driver of the own vehicle 100, i.e., an operation to the steering wheel 35 carried out by the driver of the own vehicle 100 to avoid the collision of the own vehicle 100 with the forward object 200, the vehicle collision avoidance assist apparatus 10 determines that the own vehicle 100 collides with the forward object 200 if the own vehicle 100 continues moving, keeping the current driving state of the own vehicle 100. When the vehicle collision avoidance assist apparatus 10 determines so, the vehicle collision avoidance assist apparatus 10 determines that a condition of executing the forcibly steering control, i.e., a forcibly steering execution condition Cs_steer becomes satisfied, and the forcibly steering start timing Ts_steer has come.

When the vehicle collision avoidance assist apparatus 10 determines that the forcibly steering start timing Ts_steer has come, the vehicle collision avoidance assist apparatus 10 sets, as the target avoidance route Rtgt, the avoidance route R which the vehicle collision avoidance assist apparatus 10 acquires or has acquired at this time and starts executing the forcibly steering control of controlling the steering force applied to the own vehicle 100 so as to cause the own vehicle 100 to move along the target avoidance route Rtgt.

While the vehicle collision avoidance assist apparatus 10 executes the forcibly steering control, the vehicle collision avoidance assist apparatus 10 acquires a current position of the own vehicle 100, based on the longitudinal acceleration value Gx, the lateral acceleration value Gy, the yaw rate YR, and the left and right lane markings LM, and controls the steering force applied to the own vehicle 100, based on the acquired current position of the own vehicle 100 so as to cause the own vehicle 100 to move along the target avoidance route Rtgt.

Figure 6A:
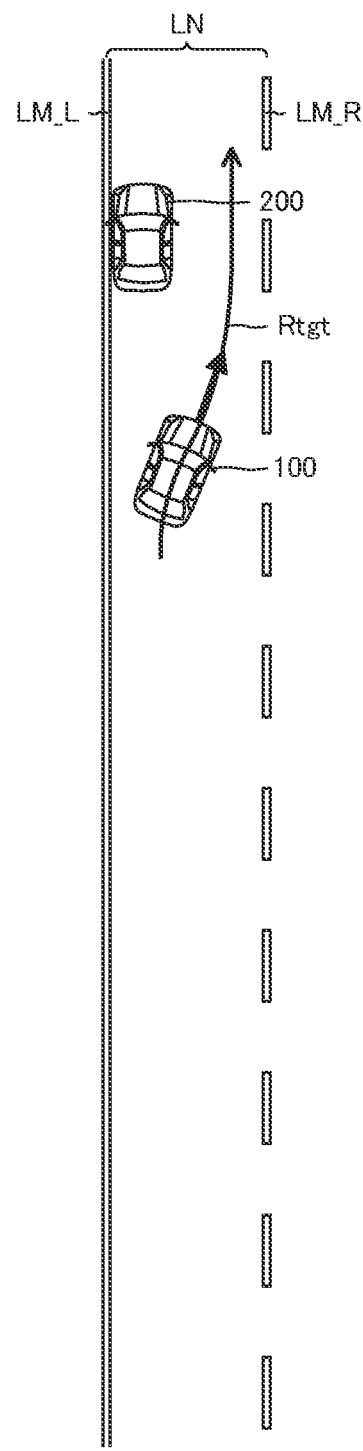
FIG. 6A is a view which shows a scene that the own vehicle starts to be turned along the target avoidance route by the forcibly steering control.
Figure 6B:
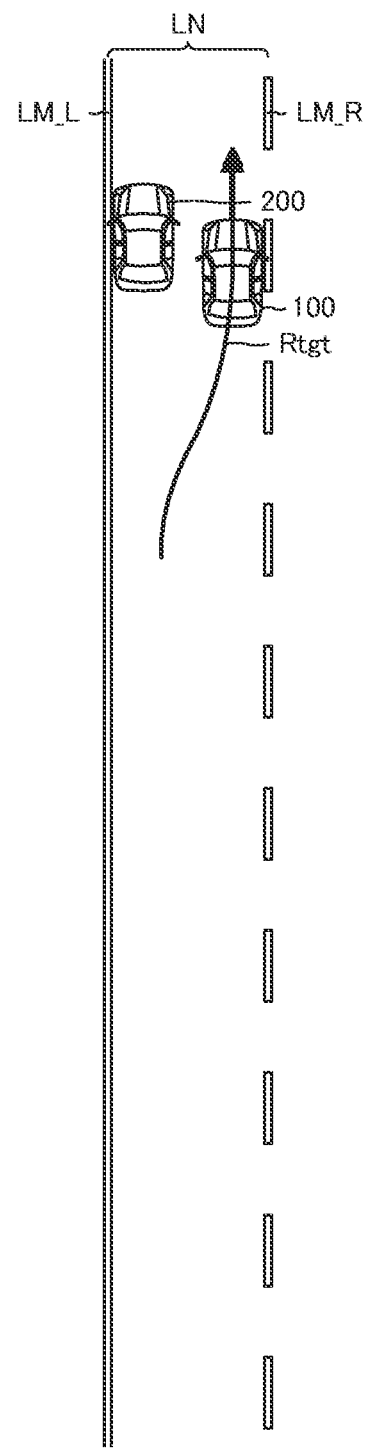
FIG. 6B is a view which shows a scene that the own vehicle is moved to pass by a forward object or the vehicle by the forcibly steering control.
Figure 6C:
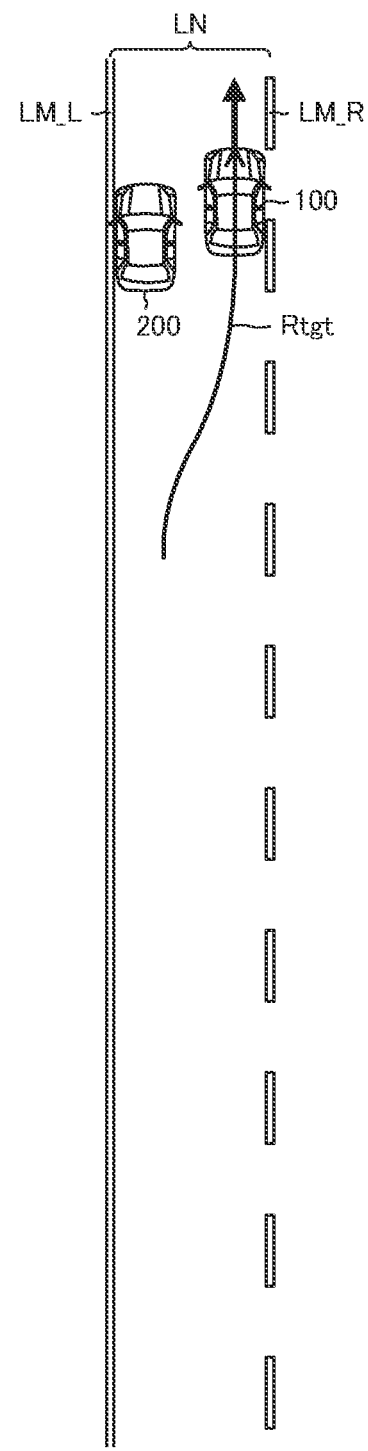
FIG. 6C is a view which shows a scene that the own vehicle has passed by the forward object or the vehicle, and an execution of the forcibly steering control is terminated.

Thereby, the own vehicle 100 starts turning as shown in FIG. 6A. Immediately afterward, the own vehicle 100 turns in the opposite direction, and the moving direction of the own vehicle 100 becomes parallel to the own vehicle moving lane LN. Then, the own vehicle 100 moves at the side of the forward object 200 as shown in FIG. 6B. Thereby, the collision of the own vehicle 100 with the forward object 200 is avoided. After the own vehicle 100 passes by the forward object 200 as shown in FIG. 6C, the vehicle collision avoidance assist apparatus 10 terminates executing the forcibly steering control.

It should be noted that when the vehicle collision avoidance assist apparatus 10 cannot acquire the avoidance route R due to reasons that there is no space at the side of the forward object 200 to allow the own vehicle 100 to move at a point of time when the forcibly steering start timing Ts_steer has come, the vehicle collision avoidance assist apparatus 10 does not execute the forcibly steering control.

Further, the vehicle collision avoidance assist apparatus 10 may be configured to decelerate the own vehicle 100 by decreasing the driving force applied to the own vehicle 100 or limiting the driving force applied to the own vehicle 100 to a certain value or less in addition to executing the forcibly steering control.

Furthermore, the vehicle collision avoidance assist apparatus 10 may be configured to apply the braking force to the own vehicle 100 to decelerate and stop the own vehicle 100 in addition to executing the forcibly steering control. In this case, the vehicle collision avoidance assist apparatus 10 may be configured to terminate executing the forcibly steering control when the own vehicle 100 stops.

Furthermore, the vehicle collision avoidance assist apparatus 10 may be configured to stop executing the forcibly steering control when the driver input torque TQs_driver becomes equal to or greater than a relatively great predetermined torque TQth while the vehicle collision avoidance assist apparatus 10 executes the forcibly steering control, in other words, when the driver of the own vehicle 100 applies an operation having an operation amount equal to or greater than a predetermined amount to the steering wheel 35 while the vehicle collision avoidance assist apparatus 10 executes the forcibly steering control.

<Setting of Forcibly Steering Start Timing>

In order to surely avoid the collision of the own vehicle 100 with the forward object 200 by the forcibly steering control, the start timing of starting executing the forcibly steering control is preferably early. However, if the start timing of starting executing the forcibly steering control is too early, an execution of the forcibly steering control may be started when the driver of the own vehicle 100 thinks that the own vehicle 100 is not so close to the forward object 200 to an extent that the driver needs to start the collision avoidance steering wheel operation (i.e., a rotation operation of rotating the steering wheel 35 for avoiding the collision of the own vehicle 100 with the forward object 200). In this case, the driver may feel a discomfort. However, if the start timing of starting executing the forcibly steering control is too late, the collision of the own vehicle 100 with the forward object 200 cannot be avoided even when the forcibly steering control is executed.

When the eyes of the driver of the own vehicle 100 are closed due to drowsiness or blackouts, the driver of the own vehicle 100 cannot recognize that the own vehicle 100 is going to collide with the forward object 200. In this case, the driver may probably not carry out the collision avoidance steering wheel operation or a collision avoidance steering operation. In this case, even when the execution of the forcibly steering control is started at an early timing, the driver does not feel a discomfort.

Further, when the driver of the own vehicle 100 cannot carry out the sufficient steering wheel operation for avoiding the collision of the own vehicle 100 with the forward object 200 since the driver does not grasp the steering wheel 35 or grasps the steering wheel 35 with only one hand, the execution of the forcibly steering control is preferably started at an early timing.

Accordingly, the vehicle collision avoidance assist apparatus 10 sets the forcibly steering start timing Ts_steer, depending on a situation of the driver of the own vehicle 100 as described below. In this embodiment, the vehicle collision avoidance assist apparatus 10 sets the forcibly steering start timing Ts_steer, depending on the situation of the driver by setting the collision determination time TTCth, depending on the situation of the driver.

The vehicle collision avoidance assist apparatus 10 determines whether the driver of the own vehicle 100 has a collision self-avoidance probability. The collision self-avoidance probability is a probability that the driver of the own vehicle 100 carries out the steering wheel operation as a driving operation to avoid the collision of the own vehicle 100 with the forward object 200.

When the vehicle collision avoidance assist apparatus 10 determines that the driver of the own vehicle 100 does not have the collision self-avoidance probability, the vehicle collision avoidance assist apparatus 10 sets the forcibly steering start timing Ts_steer earlier than the forcibly steering start timing Ts_steer set when the vehicle collision avoidance assist apparatus 10 determines that the driver of the own vehicle 100 has the collision self-avoidance probability. The forcibly steering start timing Ts_steer is advanced by increasing the collision determination time TTCth. Thus, in this embodiment, when the vehicle collision avoidance assist apparatus 10 determines that the driver of the own vehicle 100 does not have the collision self-avoidance probability, the vehicle collision avoidance assist apparatus 10 sets the collision determination time TTCth to a time longer than the collision determination time TTCth set when the vehicle collision avoidance assist apparatus 10 determines that the driver of the own vehicle 100 has the collision self-avoidance probability.

Whether the driver of the own vehicle 100 has the collision self-avoidance probability is determined, based on a driver's consciousness state and a driver's steering wheel grasping state.

In this embodiment, the driver's consciousness state corresponds to whether the eyes of the driver of the own vehicle 100 are open, i.e., whether the driver of the own vehicle 100 is conscious. The vehicle collision avoidance assist apparatus 10 determines the driver's consciousness state, based on the information provided from the driver monitor camera 71.

In this embodiment, the vehicle collision avoidance assist apparatus 10 executes a process of determining whether the driver of the own vehicle 100 has the collision self-avoidance probability, based on the driver's consciousness state with a predetermined cycle, independently of whether the forcibly steering start determination condition Cd_steer is satisfied. However, the vehicle collision avoidance assist apparatus 10 may be configured to execute the process of determining whether the driver of the own vehicle 100 has the collision self-avoidance probability, based on the driver's consciousness state when the forcibly steering start determination condition Cd_steer becomes satisfied.

When the vehicle collision avoidance assist apparatus 10 determines that the driver is conscious, the vehicle collision avoidance assist apparatus 10 determines that the driver of the own vehicle 100 has the collision self-avoidance probability. On the other hand, when the vehicle collision avoidance assist apparatus 10 determines that the driver is unconscious, the vehicle collision avoidance assist apparatus 10 determines that the driver of the own vehicle 100 does not have the collision self-avoidance probability.

Further, the driver's steering wheel grasping state is determined, based on whether (i) the driver of the own vehicle 100 grasps the steering wheel 35 with both hands, and (ii) portions of the steering wheel 35 which the driver grasps, are specified portions 35P. The vehicle collision avoidance assist apparatus 10 determines the driver's steering wheel grasping state, in particular, the portions of the steering wheel 35 which the driver of the own vehicle 100 grasps, based on the information provided from the touch sensor 41.

Figure 7:
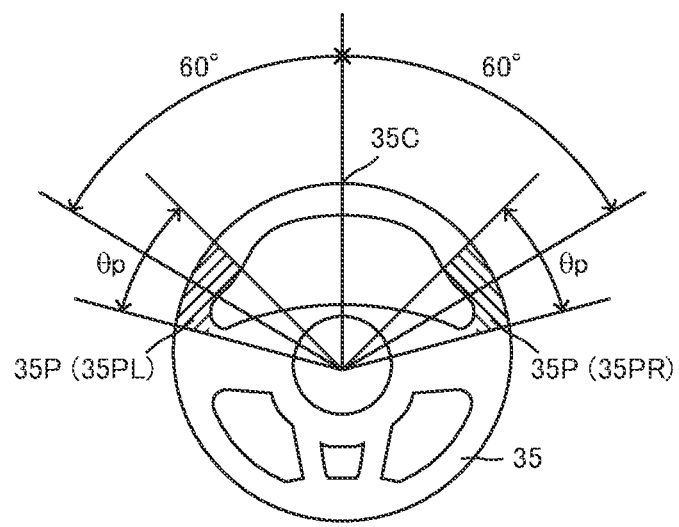
FIG. 7 is a view which shows specified portions of a steering wheel of the own vehicle.

In this embodiment, the specified portions 35P are two portions, i.e., a portion 35PR of the steering wheel 35 and a portion 35PL of the steering wheel 35, respectively as shown in FIG. 7. The portion 35PR is a portion of the steering wheel 35 which has (i) an area of a predetermined angle θp and (ii) a center position clockwise from an uppermost center portion 35C of the steering wheel 35 by 60 degrees. The portion 35PL is a portion of the steering wheel 35 which has (i) an area of the predetermined angle θp and (ii) a center position counterclockwise from the uppermost center portion 35C of the steering wheel 35 by 60 degrees. The uppermost center portion 35C is an uppermost portion of the steering wheel 35 when the steering wheel 35 is positioned at a neutral position.

In this embodiment, the vehicle collision avoidance assist apparatus 10 executes a process of determining whether the driver of the own vehicle 100 has the collision self-avoidance probability, based on the driver's steering wheel grasping state with a predetermined cycle, independently of whether the forcibly steering start determination condition Cd_steer is satisfied. However, the vehicle collision avoidance assist apparatus 10 may be configured to execute the process of determining whether the driver of the own vehicle 100 has the collision self-avoidance probability, based on the driver's steering wheel grasping state when the forcibly steering start determination condition Cd_steer becomes satisfied.

When the driver of the own vehicle 100 grasps the specified portions 35P of the steering wheel 35 with both hands, the vehicle collision avoidance assist apparatus 10 determines that the driver of the own vehicle 100 has the collision self-avoidance probability. On the other hand, when the driver of the own vehicle 100 does not grasp the specific portions 35P of the steering wheel 35 with both hands, the vehicle collision avoidance assist apparatus 10 determines that the driver of the own vehicle 100 does not have the collision self-avoidance probability.

When the vehicle collision avoidance assist apparatus 10 determines that (i) the driver of the own vehicle 100 has the collision self-avoidance probability, based on the driver's consciousness state and (ii) the driver of the own vehicle 100 has the collision self-avoidance probability, based on the driver's steering wheel grasping state, the vehicle collision avoidance assist apparatus 10 sets the collision determination time TTCth to a first time TTC_1. In this embodiment, the first time TTC_1 is set to a standard time. Thus, when the collision determination time TTCth is set to the first time TTC_1, the forcibly steering start timing Ts_steer is a standard timing.

On the other hand, when the vehicle collision avoidance assist apparatus 10 determines that (i) the driver of the own vehicle 100 has the collision self-avoidance probability, based on the driver's consciousness state, but (ii) the driver of the own vehicle 100 does not have the collision self-avoidance probability, based on the driver's steering wheel grasping state, the vehicle collision avoidance assist apparatus 10 sets the collision determination time TTCth to a second time TTC_2. The second time TTC_2 is set to a time longer than the first time TTC_1. Thus, when the collision determination time TTCth is set to the second time TTC_2, the forcibly steering start timing Ts_steer is a timing earlier than the forcibly steering start timing Ts_steer realized when the collision determination time TTCth is set to the first time TTC_1.

Further, when the vehicle collision avoidance assist apparatus 10 determines that the driver of the own vehicle 100 does not have the collision self-avoidance probability, based on the driver's consciousness state, the vehicle collision avoidance assist apparatus 10 sets the collision determination time TTCth to a third time TTC_3, independently of whether the driver of the own vehicle 100 has the collision self-avoidance probability, based on the driver's steering wheel grasping state. The third time TTC_3 is set to a time longer than the second time TTC_2. Thus, when the collision determination time TTCth is set to the third time TTC_3, the forcibly steering start timing Ts_steer is a timing earlier than the forcibly steering start timing Ts_steer realized when the collision determination time TTCth is set to the second time TTC_2.

The summary of the operations of the vehicle collision avoidance assist apparatus 10 has been described. With the vehicle collision avoidance assist apparatus 10, the execution of the forcibly steering control is started at a timing, depending on the probability that the collision of the own vehicle 100 with the forward object 200 can be avoided by the steering wheel operation carried out by the driver of the own vehicle 100. Thus, the execution of the forcibly steering control is started at an appropriate timing without providing the driver of the own vehicle 100 with a discomfort.

First Modified Example

It should be noted that the vehicle collision avoidance assist apparatus 10 may be configured to set the forcibly steering start timing Ts_steer such that the forcibly steering start timing Ts_steer set when the vehicle collision avoidance assist apparatus 10 determines that the driver of the own vehicle 100 does not have the collision self-avoidance probability, based on any one of the driver's consciousness state and the driver's steering wheel grasping state, is earlier than the forcibly steering start timing Ts_steer set when the vehicle collision avoidance assist apparatus 10 determines that the driver of the own vehicle 100 has the collision self-avoidance probability, based on both of the driver's consciousness state and the driver's steering wheel grasping state.

The vehicle collision avoidance assist apparatus 10 configured as such according to a first modified example of the embodiment of the invention sets the collision determination time TTCth to the first time TTC_1 when the vehicle collision avoidance assist apparatus 10 determines that the driver of the own vehicle 100 has the collision self-avoidance probability, based on both of the driver's consciousness state and the driver's steering wheel grasping state.

In the first modified example, the first time TTC_1 is the same as the first time TTC_1 of the embodiment described above. However, the first time TTC_1 of the first modified example may be different from the first time TTC_1 of the embodiment described above.

On the other hand, when the vehicle collision avoidance assist apparatus 10 according to the first modified example determines that the driver of the own vehicle 100 does not have the collision self-avoidance probability, based on any one of the driver's consciousness state and the driver's steering wheel grasping state, the vehicle collision avoidance assist apparatus 10 sets the collision determination time TTCth to the second time TTC_2.

In the first modified example, the second time TTC_2 is longer than the first time TTC_1. In this regard, the second time TTC_2 of the first modified example may be the same as or different from the second time TTC_2 of the embodiment described above. It should be noted that in the first modified example, the second time TTC_2 is the same as the third time TTC_3 of the embodiment described above.

Second Modified Example

Further, the vehicle collision avoidance assist apparatus 10 may be configured to set the forcibly steering start timing Ts_steer, depending on (i) whether the driver of the own vehicle 100 grasps the steering wheel 35, (ii) whether the driver of the own vehicle 100 grasps the steering wheel 35 with both hands when the driver grasps the steering wheel 35, and (iii) whether the driver of the own vehicle 100 grasps the specified portions 35P of the steering wheel 35 when the driver grasps the steering wheel 35.

The vehicle collision avoidance assist apparatus 10 configured as such according to a second modified example of the embodiment of the invention sets the collision determination time TTCth to the first time TTC_1 when the vehicle collision avoidance assist apparatus 10 determines that (i) the driver of the own vehicle 100 has the collision self-avoidance probability, based on the driver's consciousness state and (ii) the driver of the own vehicle 100 grasps the specified portions 35P of the steering wheel 35 with both hands, i.e., the driver of the own vehicle 100 has the collision self-avoidance probability, based on the driver's steering wheel grasping state.

In the second modified example, the first time TTC_1 is the same as the first time TTC_1 of the embodiment described above. However, the first time TTC_1 of the second modified example may be different from the first time TTC_1 of the embodiment described above.

On the other hand, when the vehicle collision avoidance assist apparatus 10 according to the second modified example determines that (i) the driver of the own vehicle 100 has the collision self-avoidance probability, based on the driver's consciousness state and (ii) the driver of the own vehicle 100 grasps the steering wheel 35 with both hands, but (iii) the portions of the steering wheel 35 which the driver grasps are not the specified portions 35P of the steering wheel 35, the vehicle collision avoidance assist apparatus 10 sets the collision determination time TTCth to the second time TTC_2.

In the second modified example, the second time TTC_2 is longer than the first time TTC_1. In this regard, the second time TTC_2 of the second modified example may be the same as or different from the second time TTC_2 of the embodiment described above.

Further, when the vehicle collision avoidance assist apparatus 10 according to the second modified example determines that (i) the driver of the own vehicle 100 has the collision self-avoidance probability, based on the driver's consciousness state and (ii) the driver of the own vehicle 100 grasps the steering wheel 35 with only one hand, but (iii) the portion of the steering wheel 35 which the driver grasps is the specified portion 35P of the steering wheel 35, the vehicle collision avoidance assist apparatus 10 sets the collision determination time TTCth to the third time TTC_3.

In the second modified example, the third time TTC_3 is longer than the second time TTC_2. In this regard, the third time TTC_3 of the second modified example may be the same as or different from the third time TTC_3 of the embodiment described above.

Further, when the vehicle collision avoidance assist apparatus 10 according to the second modified example determines that (i) the driver of the own vehicle 100 has the collision self-avoidance probability, based on the driver's consciousness state and (ii) the driver of the own vehicle 100 does not grasp the steering wheel 35, the vehicle collision avoidance assist apparatus 10 sets the collision determination time TTCth to a fourth time TTC_4.

In the second modified example, the fourth time TTC_4 is longer than the third time TTC_3.

Further, when the vehicle collision avoidance assist apparatus 10 according to the second modified example determines that the driver of the own vehicle 100 has the collision self-avoidance probability, based on the driver's consciousness state, the vehicle collision avoidance assist apparatus 10 sets the collision determination time TTCth to a fifth time TTC_5 independently of whether the driver of the own vehicle 100 has the collision self-avoidance probability, based on the driver's steering wheel grasping state.

In the second modified example, the fifth time TTC_5 is longer than the fourth time TTC_4. In particular, the fifth time TTC_5 of the second modified example is the same as the third time TTC_3 of the embodiment described above.

Further, the vehicle collision avoidance assist apparatus 10 may be configured to execute a forcibly braking control in addition to or in place of executing the forcibly steering control. The forcibly braking control is a control of forcibly applying the braking force to the own vehicle 100 and stopping the own vehicle 100 before the forward object 200 to avoid the collision of the own vehicle 100 with the forward object 200.

Figure 8A:
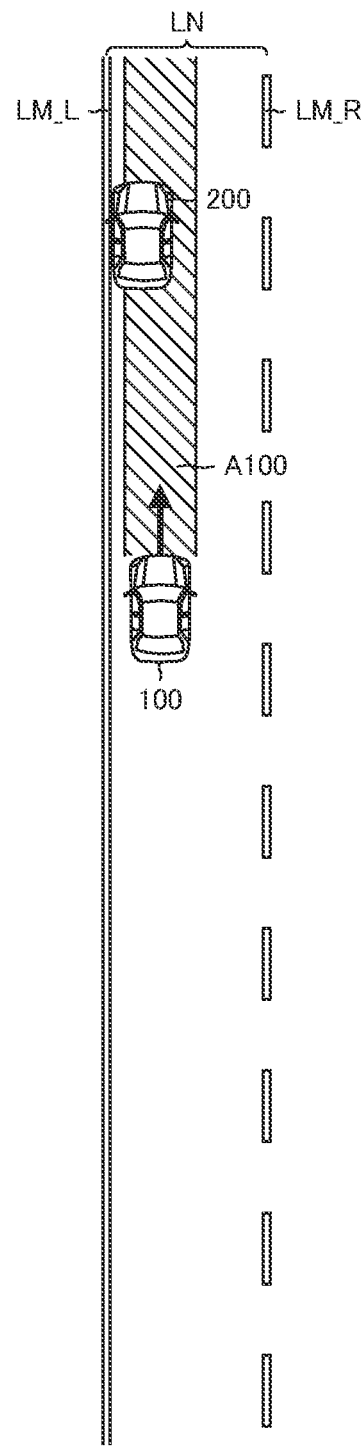
FIG. 8A is a view which shows a scene that a start timing of starting executing a forcibly braking control has come.

Also in this case, as shown in FIG. 8A, when (i) the own vehicle 100 approaches the forward object 200 without the collision avoidance steering wheel operation carried out by the driver of the own vehicle 100, and (ii) the predicted reaching time TTC decreases to the collision determination time TTCth, the vehicle collision avoidance assist apparatus 10 determines that the own vehicle 100 collides with the forward object 200 if the own vehicle 100 continues moving, keeping the current driving state of the own vehicle 100. When the vehicle collision avoidance assist apparatus 10 determines so, the vehicle collision avoidance assist apparatus 10 determines that (i) a condition of executing the forcibly braking control, i.e., a forcibly braking execution condition Cs_brake becomes satisfied and (ii) a forcibly braking start timing Ts_brake has come.

When the vehicle collision avoidance assist apparatus 10 determines that the forcibly braking start timing Ts_brake has come, the vehicle collision avoidance assist apparatus 10 sets a deceleration value of the own vehicle 100 necessary to stop the own vehicle 100 before the forward object 200 as a target deceleration value Gtgt and starts executing the forcibly braking control of controlling the braking force applied to the own vehicle 100 so as to decelerate the own vehicle 100 at the target deceleration value Gtgt.

Figure 8B:
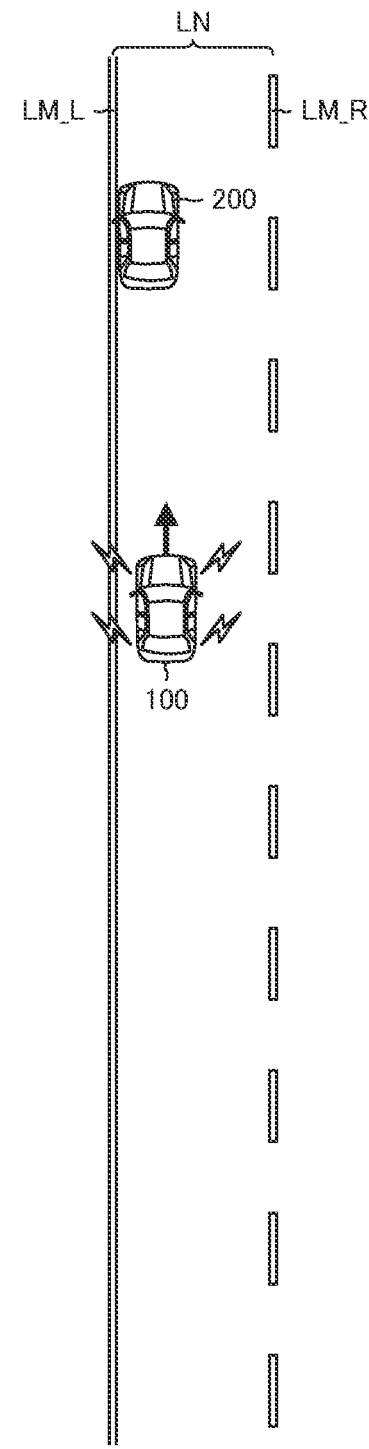
FIG. 8B is a view which shows a scene that a braking force starts to be applied to the own vehicle by the forcibly braking control.
Figure 8C:
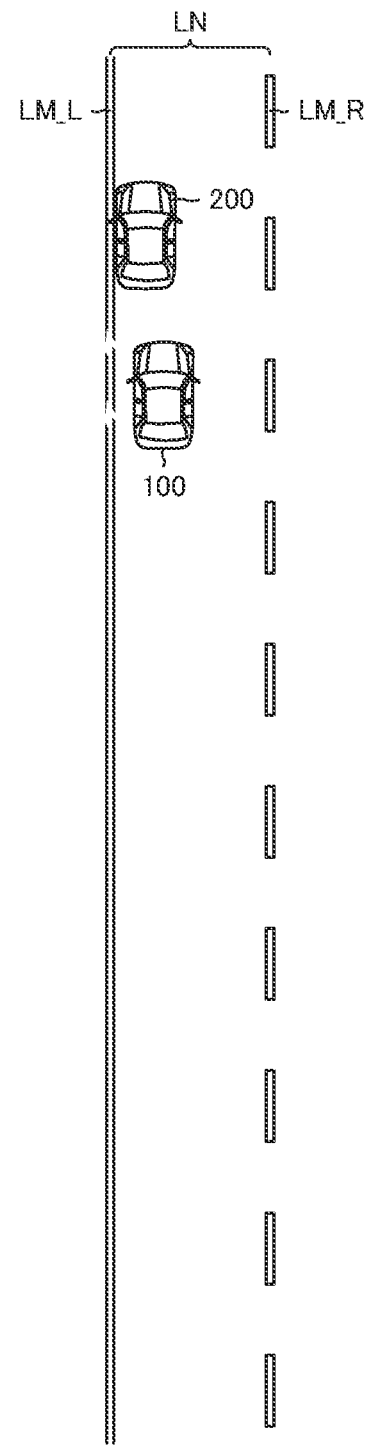
FIG. 8C is a view which shows a scene that the own vehicle is stopped before the forward object or the vehicle, and an execution of the forcibly braking control is terminated.

Thereby, the own vehicle 100 starts to be braked as shown in FIG. 8B and then, is stopped before the forward object 200 as shown in FIG. 8C. Thereby, the collision of the own vehicle 100 with the forward object 200 is avoided. When the vehicle collision avoidance assist apparatus 10 stops the own vehicle 100 before the forward object 200, the vehicle collision avoidance assist apparatus 10 terminates executing the forcibly braking control.

When the vehicle collision avoidance assist apparatus 10 is configured to execute the forcibly braking control as described above, the vehicle collision avoidance assist apparatus 10 may be configured to adjust the start timing of starting executing the forcibly braking control by setting the collision determination time TTCth, depending on the collision self-avoidance probability as described above.

That is, when the vehicle collision avoidance assist apparatus 10 is configured to (i) execute the forcibly steering control and/or the forcibly braking control as the collision avoidance control for avoiding the collision of the own vehicle 100 with the forward object 200 and (ii) determines that the driver of the own vehicle 100 does not have the collision self-avoidance probability, the vehicle collision avoidance assist apparatus 10 may be configured to set the start timing of starting executing the collision avoidance control to a timing earlier than a timing set when the vehicle collision avoidance assist apparatus 10 determines that that the driver of the own vehicle 100 has the collision self-avoidance probability.

<Specific Operations of Vehicle Collision Avoidance Assist Apparatus>

Figure 9:
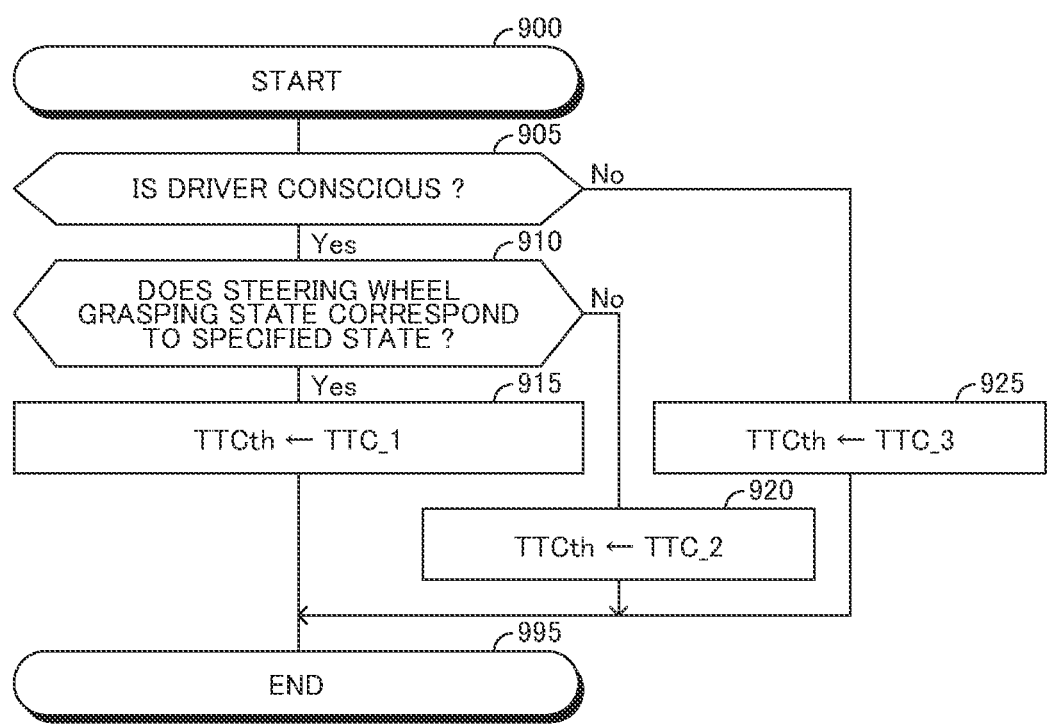
FIG. 9 is a view which shows a flowchart of a routine executed by the vehicle collision avoidance assist apparatus according to the embodiment of the invention.

Next, specific operations of the vehicle collision avoidance assist apparatus 10 will be described. The CPU of the ECU 90 of the vehicle collision avoidance assist apparatus 10 according to the embodiment of the invention is configured or programmed to execute a routine shown in FIG. 9 with a predetermined calculation cycle. Thus, at a predetermined timing, the CPU starts executing a process from a step 900 of the routine shown in FIG. 9 and proceeds with the process to a step 905 to determine whether the driver of the own vehicle 100 is conscious. That is, the CPU determines whether the driver of the own vehicle 100 has the collision self-avoidance probability, based on the driver's consciousness state.

When the CPU determines "Yes" at the step 905, the CPU proceeds with the process to a step 910 to determine whether the driver's steering wheel grasping state of the own vehicle 100 corresponds to a specified state, i.e., a state that the driver grasps the specified portions 35P of the steering wheel 35 with both hands. That is, the CPU determines whether the driver of the own vehicle 100 has the collision self-avoidance probability, based on the steering wheel grasping state.

When the CPU determines "Yes" at the step 910, the CPU proceeds with the process to a step 915 to set the first time TTC_1 as the collision determination time TTCth. Next, the CPU proceeds with the process to a step 995 to terminate executing this routine once.

On the other hand, when the CPU determines "No" at the step 910, the CPU proceeds with the process to a step 920 to set the second time TTC_2 as the collision determination time TTCth. Next, the CPU proceeds with the process to the step 995 to terminate executing this routine once.

Further, when the CPU determines "No" at the step 905, the CPU proceeds with the process to a step 925 to set the third time TTC_3 as the collision determination time TTCth. Next, the CPU proceeds with the process to the step 995 to terminate executing this routine once.

Figure 10:
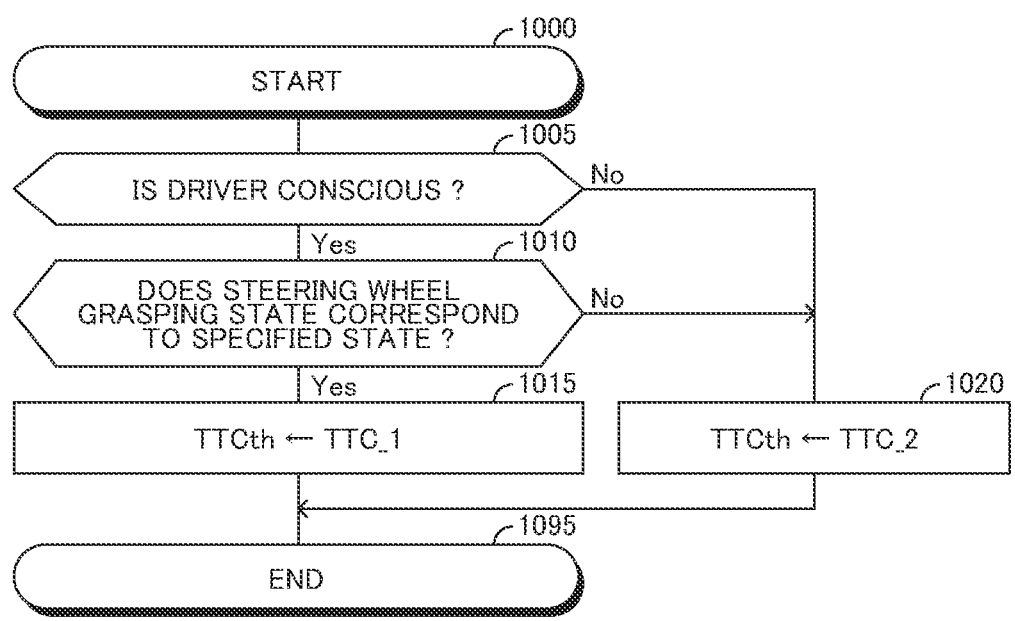
FIG. 10 is a view which shows a flowchart of a routine executed by the vehicle collision avoidance assist apparatus according to a first modified example of the embodiment of the invention.

Further, the CPU of the ECU 90 of the vehicle collision avoidance assist apparatus 10 according to the first modified example is configured or programmed to execute a routine shown in FIG. 10 with the predetermined calculation cycle. Thus, at a predetermined timing, the CPU starts executing a process from a step 1000 of the routine shown in FIG. 10 and proceeds with the process to a step 1005 to determine whether the driver of the own vehicle 100 is conscious. That is, the CPU determines whether the driver of the own vehicle 100 has the collision self-avoidance probability, based on the driver's consciousness state.

When the CPU determines "Yes" at the step 1005, the CPU proceeds with the process to a step 1010 to determine whether the driver's steering wheel grasping state of the own vehicle 100 corresponds to the specified state, i.e., the state that the driver grasps the specified portions 35P of the steering wheel 35 with both hands. That is, the CPU determines whether the driver of the own vehicle 100 has the collision self-avoidance probability, based on the steering wheel grasping state.

When the CPU determines "Yes" at the step 1010, the CPU proceeds with the process to a step 1015 to set the first time TTC_1 as the collision determination time TTCth. Next, the CPU proceeds with the process to a step 1095 to terminate executing this routine once.

On the other hand, when the CPU determines "No" at the step 1010, the CPU proceeds with the process to a step 1020 to set the second time TTC_2 as the collision determination time TTCth. Next, the CPU proceeds with the process to the step 1095 to terminate executing this routine once.

Also, when the CPU determines "No" at the step 1005, the CPU proceeds with the process to the step 1020 to set the second time TTC_2 as the collision determination time TTCth. Next, the CPU proceeds with the process to the step 1095 to terminate executing this routine once.

Figure 11:
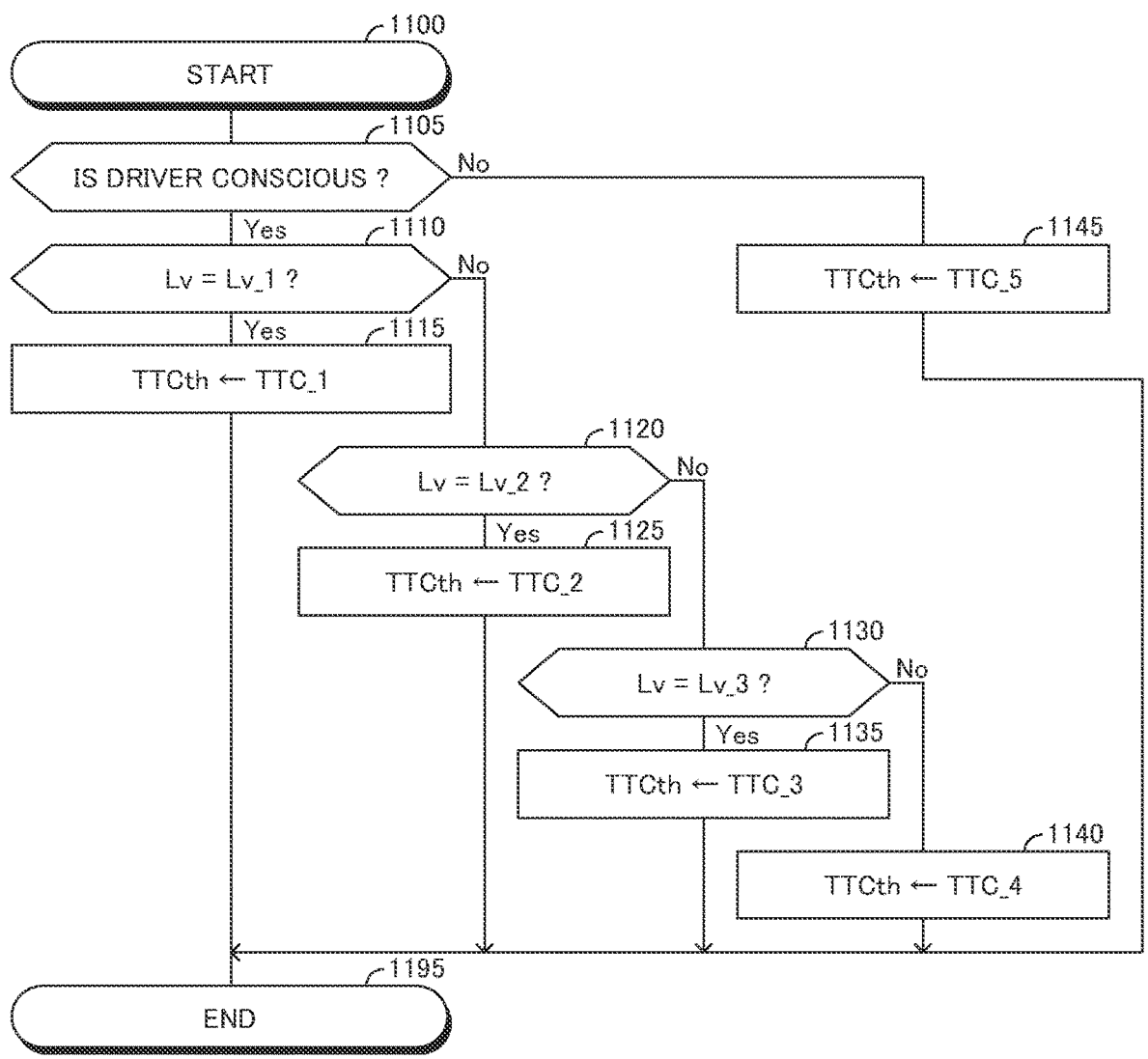
FIG. 11 is a view which shows a flowchart of a routine executed by the vehicle collision avoidance assist apparatus according to a second modified example of the embodiment of the invention.

Further, the CPU of the ECU 90 of the vehicle collision avoidance assist apparatus 10 according to the second modified example is configured or programmed to execute a routine shown in FIG. 11 with the predetermined calculation cycle. Thus, at a predetermined timing, the CPU starts executing a process from a step 1100 of the routine shown in FIG. 11 and proceeds with the process to a step 1105 to determine whether the driver of the own vehicle 100 is conscious. That is, the CPU determines whether the driver of the own vehicle 100 has the collision self-avoidance probability, based on the driver's consciousness state.

When the CPU determines "Yes" at the step 1105, the CPU proceeds with the process to a step 1110 to determine whether a grasping level Lv corresponds to a first level Lv_1. The first level Lv_1 is a level that the driver of the own vehicle 100 grasps the specified portions 35P of the steering wheel 35 with both hands.

When the CPU determines "Yes" at the step 1110, the CPU proceeds with the process to a step 1115 to set the first time TTC_1 as the collision determination time TTCth. Next, the CPU proceeds with the process to a step 1195 to terminate executing this routine once.

On the other hand, when the CPU determines "No" at the step 1110, the CPU proceeds with the process to a step 1120 to determine whether the grasping level Lv corresponds to a second level Lv_2. The second level Lv_2 is a level that the driver of the own vehicle 100 grasps the steering wheel 35 with both hands, but the portions of the steering wheel 35 which the driver grasps are not the specified portions 35P of the steering wheel 35.

When the CPU determines "Yes" at the step 1120, the CPU proceeds with the process to a step 1125 to set the second time TTC_2 as the collision determination time TTCth. Next, the CPU proceeds with the process to the step 1195 to terminate executing this routine once.

On the other hand, when the CPU determines "No" at the step 1120, the CPU proceeds with the process to a step 1130 to determine whether the grasping level Lv corresponds to a third level Lv_3. The third level Lv_3 is a level that the driver of the own vehicle 100 grasps the steering wheel 35 with only one hand, but the portion of the steering wheel 35 which the driver grasps is the specified portion 35P of the steering wheel 35.

When the CPU determines "Yes" at the step 1130, the CPU proceeds with the process to a step 1135 to set the third time TTC_3 as the collision determination time TTCth. Next, the CPU proceeds with the process to the step 1195 to terminate executing this routine once.

When the CPU determines "No" at the step 1130, the CPU proceeds with the process to a step 1140 to set the fourth time TTC_4 as the collision determination time TTCth. Next, the CPU proceeds with the process to the step 1195 to terminate executing this routine once.

When the CPU determines "No" at the step 1105, the CPU proceeds with the process to a step 1145 to set the fifth time TTC_5 as the collision determination time TTCth. Next, the CPU proceeds with the process to the step 1195 to terminate executing this routine once.

Figure 12:
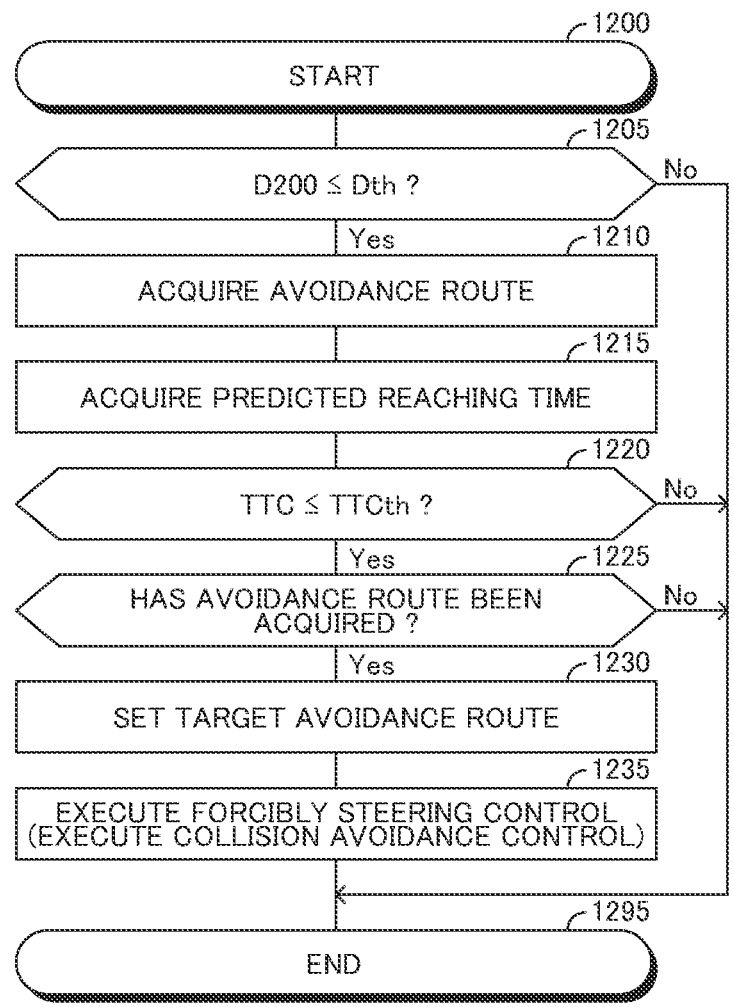
FIG. 12 is a view which shows a flowchart of a routine executed by the vehicle collision avoidance assist apparatus according to the embodiment of the invention, and the first and second modified examples of the embodiment of the invention.

In addition, the CPU is configured or programmed to execute a routine shown in FIG. 12 with the predetermined calculation cycle. Thus, at a predetermined timing, the CPU starts executing a process from a step 1200 of the routine shown in FIG. 12 and proceeds with the process to a step 1205 to determine whether the avoidance route acquisition condition Croute and the forcibly steering start determination condition Cd_steer are satisfied. In particular, the CPU determines whether the object distance D200 is equal to or shorter than the collision probability determination distance Dth.

When the CPU determines "Yes" at the step 1205, the CPU proceeds with the process to a step 1210 to acquire the avoidance route R. Next, the CPU proceeds with the process to a step 1215 to acquire the predicted reaching time TTC.

Next, the CPU proceeds with the process to a step 1220 to determine whether the forcibly steering execution condition Cs_steer is satisfied. In particular, the CPU determines whether the predicted reaching time TTC is equal to or shorter than the collision determination time TTCth.

When the CPU determines "Yes" at the step 1220, the CPU proceeds with the process to a step 1225 to determine whether the CPU has acquired the avoidance route R.

When the CPU determines "Yes" at the step 1225, the CPU proceeds with the process to a step 1230 to set the acquired avoidance route R as the target avoidance route Rtgt. Next, the CPU proceeds with the process to a step 1135 to execute the forcibly steering control. Next, the CPU proceeds with the process to a step 1295 to terminate executing this routine once.

On the other hand, when the CPU determines "No" at the step 1225, the CPU proceeds with the process to the step 1295 to terminate executing this routine once. In this case, the forcibly steering control is not executed.

Further, when the CPU determines "No" at the step 1205 or the step 1220, the CPU proceeds with the process to the step 1295 to terminate executing this routine once. Also, in this case, the forcibly steering control is not executed.

Figure 13:
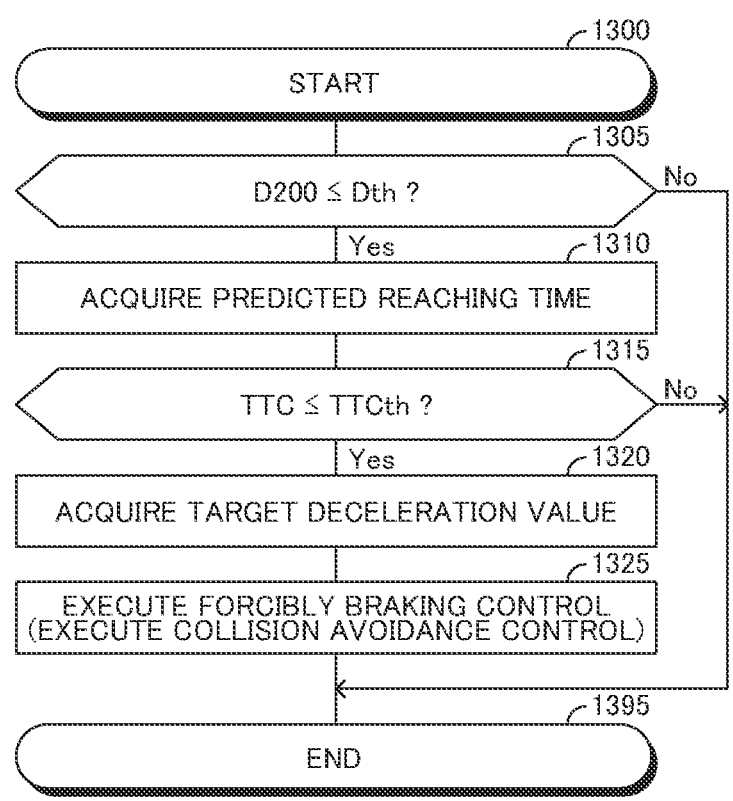
FIG. 13 is a view which shows a flowchart of a routine executed by the vehicle collision avoidance assist apparatus according to the embodiment of the invention, and the first and second modified examples of the embodiment of the invention.

It should be noted that when the vehicle collision avoidance assist apparatus 10 is configured to execute the forcibly braking control in place of executing the forcibly steering control, the CPU is configured to execute a routine shown in FIG. 13 with the predetermined calculation cycle. Thus, at a predetermined timing, the CPU starts executing a process from a step 1300 of the routine shown in FIG. 13 and proceeds with the process to a step 1305 to determine whether a forcibly braking start timing determination condition is satisfied. In particular, the CPU determines whether the object distance D200 is equal to or shorter than the collision probability determination distance Dth.

When the CPU determines "Yes" at the step 1305, the CPU proceeds with the process to a step 1310 to acquire the predicted reaching time TTC. Next, the CPU proceeds with the process to a step 1315 to determine whether the forcibly braking execution condition Cs_brake is satisfied. In particular, the CPU determines whether the predicted reaching time TTC is equal to or shorter than the collision determination time TTCth.

When the CPU determines "Yes" at the step 1315, the CPU proceeds with the process to a step 1320 to acquire the target deceleration value Gtgt. Next, the CPU proceeds with the process to a step 1325 to execute the forcibly braking control. Next, the CPU proceeds with the process to a step 1395 to terminate executing this routine once.

On the other hand, when the CPU determines "No" at the step 1315, the CPU proceeds with the process to the step 1395 to terminate executing this routine once. In this case, the forcibly braking control is not executed.

Further, when the CPU determines "No" at the step 1305, the CPU proceeds with the process to the step 1395 to terminate executing this routine once.

The specific operations of the vehicle collision avoidance assist apparatus 10 have been described.

It should be noted that the invention is not limited to the aforementioned embodiments, and various modifications can be employed within the scope of the invention.

What is claimed is:

1. A vehicle collision avoidance assist apparatus which comprises an electronic control unit configured to execute a collision avoidance control for avoiding a collision of an own vehicle with an object ahead of the own vehicle,
   wherein the electronic control unit is configured to:
   determine whether a driver of the own vehicle has a collision self-avoidance probability that the driver of the own vehicle can avoid the collision of the own vehicle with the object ahead of the own vehicle by carrying out a driving operation to the own vehicle; and
   when the electronic control unit determines that the driver of the own vehicle does not have the collision self-avoidance probability, set a start timing of starting executing the collision avoidance control to a timing earlier than the start timing set when the electronic control unit determines that the driver of the own vehicle has the collision self-avoidance probability; and
   detect a grasping state of the driver of the own vehicle grasping a steering wheel of the own vehicle and a consciousness state of the driver of the own vehicle;
   determine whether the driver of the own vehicle has the collision self-avoidance probability, based on the grasping state and the consciousness state; and
   when the electronic control unit determines that the driver of the own vehicle does not have the collision self-avoidance probability, based on the consciousness state, set the start timing of starting executing the collision avoidance control to a timing earlier than the start timing set when the electronic control unit determines that the driver of the own vehicle does not have the collision self-avoidance probability, based on the grasping state.

2. The vehicle collision avoidance assist apparatus as set forth in claim 1, wherein the electronic control unit is configured to execute a forcibly steering control of forcibly steering the own vehicle as the collision avoidance control to avoid the collision of the own vehicle with the object ahead of the own vehicle.

3. The vehicle collision avoidance assist apparatus as set forth in claim 1, wherein the electronic control unit is configured to detect portions of the steering wheel which the driver of the own vehicle grasps as the grasping state.

4. A vehicle collision avoidance assist apparatus which comprises an electronic control unit configured to execute a collision avoidance control for avoiding a collision of an own vehicle with an object ahead of the own vehicle,
   wherein the electronic control unit is configured to:
   determine whether a driver of the own vehicle has a collision self-avoidance probability that the driver of the own vehicle can avoid the collision of the own vehicle with the object ahead of the own vehicle by carrying out a driving operation to the own vehicle; and
   when the electronic control unit determines that the driver of the own vehicle does not have the collision self-avoidance probability, set a start timing of starting executing the collision avoidance control to a timing earlier than the start timing set when the electronic control unit determines that the driver of the own vehicle has the collision self-avoidance probability,
   wherein the electronic control unit is configured to:
   detect a grasping state of the driver of the own vehicle grasping a steering wheel of the own vehicle and a consciousness state of the driver of the own vehicle;
   determine whether the driver of the own vehicle has the collision self-avoidance probability, based on the grasping state and the consciousness state; and
   when the electronic control unit determines that the driver of the own vehicle does not have the collision self-avoidance probability, based on the consciousness state, and the driver of the own vehicle has the collision self-avoidance probability, based on the grasping state, determine that the driver of the own vehicle does not have the collision self-avoidance probability.

5. The vehicle collision avoidance assist apparatus as set forth in claim 4, wherein the electronic control unit is configured to determine that the driver of the own vehicle does not have the collision self-avoidance probability when the electronic control unit determines that the driver of the own vehicle has the collision self-avoidance probability, based on the consciousness state, and the driver of the own vehicle does not have the collision self-avoidance probability, based on the grasping state.

6. The vehicle collision avoidance assist apparatus as set forth in claim 4, wherein the electronic control unit is configured to execute a forcibly steering control of forcibly steering the own vehicle as the collision avoidance control to avoid the collision of the own vehicle with the object ahead of the own vehicle.

7. The vehicle collision avoidance assist apparatus as set forth in claim 4, wherein the electronic control unit is configured to detect portions of the steering wheel which the driver of the own vehicle grasps as the grasping state.

* * * * *